United States Patent Office 2,812,829
Patented Nov. 12, 1957

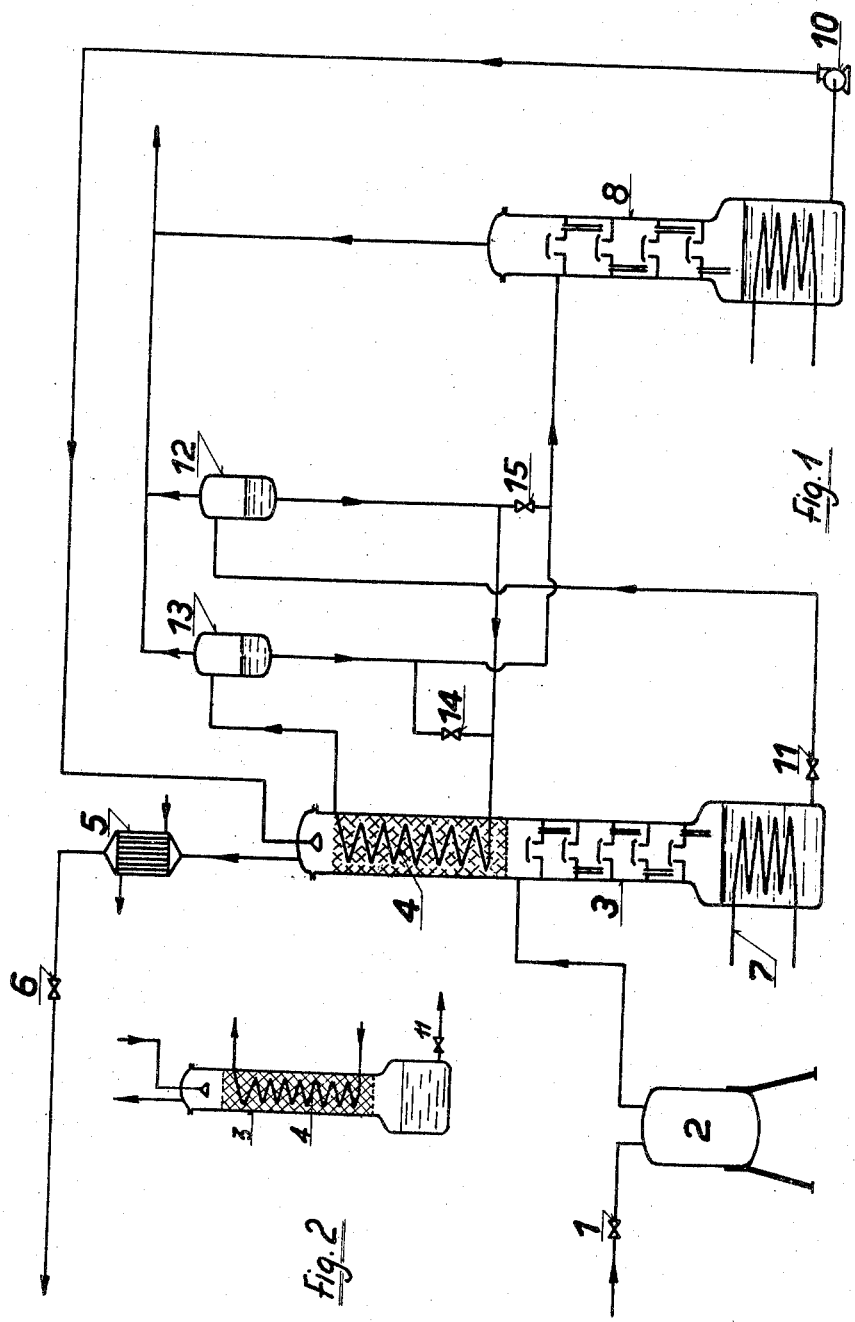

2,812,829
PROCESS FOR SEPARATING CARBON DIOXIDE AND AMMONIA

Gerlando Marullo, Novara, and Rinaldo Mazzetti, Milan, Italy, assignors to Montecatini, Societa Generale per l'Industria Mineraria e Chimica, a corporation of Italy Application July 21, 1955, Serial No. 523,575

Claims priority, application Italy July 27, 1954

4 Claims. (Cl. 183—115)

The present invention relates to an improved process for separating gas mixtures and more in particular to the separating of gas mixtures containing carbon dioxide and ammonia.

As is known in the art, it has been proposed to separate the components of such mixtures, in particular the carbon dioxide and ammonia of the effluent carbon dioxide, ammonia and water mixtures from the pressure synthesis of urea from carbon dioxide and ammonia, after separation by expansion from the urea produced, by means of selective absorption of ammonia in an ammonium salt solution, for example an aqueous solution of ammonium nitrate, or in a urea salt solution, such as an aqueous solution of urea nitrate.

Said absorption may be carried out under pressure higher than atmospheric and at temperatures up to about 140° C.

However there is a drawback in these conventional methods in that, while during the said selective absorption the heat of absorption must be removed, in order to keep the temperature constant at which absorption is effected at the most favourable point from the point of view of selectivity and from the point of view of concentration, heat must nevertheless be supplied for subsequent stripping of the absorbed ammonia from the solution.

Although it may be obvious to think of recovering the absorption heat removed from the absorption stage, and utilizing it for the required heating in the stripping stage, the problem of doing so has not been solved until now.

It is possible to produce steam by heat exchange by means of the heat of absorption removed, from water used for cooling in the absorption stage, and to use said steam as a source of heat in the stripping stage. However, this involves two stages of heat exchange, that is, two temperature drops involving considerable loss of heat respectively in the two stages. Moreover, the difference of temperature between the preferred temperature of absorption and the stripping temperature is too small to permit practical operation with two temperature drops. The same inconvenience would occur if one circulates a heat-exchange fluid through the two stages to act as a cooling medium in the absorption stage and as a heating medium in the stripping stage.

Now it has been found that one stage of heat exchange can be dispensed with by using the absorbent solution itself as a coolant in the absorption stage.

It is an object of the present invention accordingly, to provide a new and improved process for the separation of gas mixtures, in particular for the separation of the tail gases from the synthesis of urea from carbon dioxide and ammonia, wherein the amount of heat needed for heating in the stripping stage is substantially reduced.

It is accordingly another object of the invention to use the absorbent solution to remove the heat of absorption.

It is a further object of the present invention to provide improved means for adjustment of the temperature of absorption, ta any desired point within given limits of from 90° C. to 140° C. so as to provide improved flexibility of operation, and this in a simple manner. The process of the invention comprises expanding the effluent, comprising absorbent solution plus absorbed component, from a selective absorption tower to evaporate part of the absorbed component on its way to a first gas-liquid separator, circulating the liquid from this first separator through a heat exchanger for removing heat of absorption from said absorption tower, thus heating up the liquid used as a coolant in the heat exchanger to evaporate a further amount of the absorbed component, passing the liquid to a second separator and therefrom to a stripping column to separate the remaining absorbed component from the absorbent solution, and feeding the stripped solution to the top of the absorption column. For the purpose of adjusting the temperature in the absorption column to a predetermined value, part of the liquid from said first separator may be passed directly to the stripping column, and part of the liquid from said second separator may be circulated again through said heat exchanger.

This method is applicable whether or not the absorption tower be provided with a lower rectifying section.

The accompanying diagrammatical drawing illustrates one embodiment of the process of the invention, Fig. 1 representing the flow sheet of the circuit comprising an absorption tower having a lower rectifying section, while Fig. 2 represents, in smaller scale, part of said circuit when an absorption tower without a lower rectifying section is used, reference numerals being the same in the two figures for corresponding parts.

With reference to the drawings, and referring to urea synthesis from $CO_2$ and $NH_3$, the urea solution coming from the synthesis autoclave is released through valve 1 to a pressure of 2–5 atm. in the tank 2, wherein, by heating, evaporation of both unreacted ammonia and carbon dioxide is brought about. The gaseous mixture is conveyed to the absorption tower 3, wherein the ammonia is absorbed by a selective absorbent solution fed from top of the tower. Said tower is provided with a heat exchanger symbolized at 4. The ammonia solution collected at the bottom of tower 3 is released through valve 11, to a pressure lower than absorption pressure, e. g. either to atmospheric pressure or to a pressure higher than atmospheric but lower than absorption pressure or even to a pressure lower than atmospheric; it is then conveyed to a gas-liquid separator 12. As a result of pressure release, part of the absorbed ammonia distills and the solution is thus cooled. The distilled gaseous ammonia is separated in the separator 12 from the solution and removed.

The separated solution is conveyed, wholly or partly, to the heat exchanger 4 by operating the valve 15.

Gas evaporation from the solution passing through the exchanger 4 is brought about by the absorption heat which is evolved inside apparatus 3.

The so distilled solution and the evaporated ammonia pass to a gas-liquid separator 13, wherefrom the solution may be either wholly conveyed to the tower 8 wherein it is made free of remaining ammonia by steam heating, or it may be partially recycled to the exchanger 4 through valve 14.

As regards the thermal balance, the following is a not quite rigorous calculation which is however close enough to reality to properly elucidate the principle of this invention.

As is known, the dissolving of ammonia in watery solutions is accompanied by a remarkable development of heat, about 500 kcal./kg. $NH_3$, which has to be removed.

The amount of 500 kcal./kg. $NH_3$ as above corresponds to the heat required for distilling the ammonia from the absorbent solution.

Said solution if free from ammonia has a boiling point between 105° and 120° C. at atmospheric pressure, depending on ammonium salt concentration; if instead it contains, for example, about 55–70 gr./l. of ammonia, it has a lower boiling point as low as 70°–80° C.

By employing said liquid as a coolant in the manner herein set forth, the absorption can be carried out at a more convenient temperature, and the recovery of the heat of absorption is improved as well.

Suppose that a 60% $NH_4NO_3$ absorbing solution is employed, in the tower 3, at a temperature of 120° C., 110 gr. of $NH_3$ per litre. At the time of pressure release at valve 11 of the solution collected at the bottom of tower 3, from absorption pressure to say, atmospheric pressure, part of the $NH_3$ is evaporated to a pre-determined extent. For every 10 gr. of evaporated ammonia, the solution is cooled by a number of degrees in supplying the 5 kcal. which are needed for evaporation. It can be calculated, by means of the known specific heat, that such cooling, referred to 1 lit. solution, is 6° C. The following table was so calculated.

| Evaporated $NH_3$ (gr.) | Attained temperature (°C.) | $NH_3$ remained in solution (gr./lt.) |
| --- | --- | --- |
| 0 | 120 | 110 |
| 10 | 114 | 100 |
| 20 | 108 | 90 |
| 30 | 102 | 80 |
| 40 | 96 | 70 |
| 50 | 90 | 60 |
| 60 | 84 | 50 |
| 70 | 78 | 40 |
| 80 | 72 | 30 |

From the data tabulated above in the second and third column the figures 84° C./50 gr. of $NH_3$ in 1 l. of solution are seen to be those of a solution in equilibrium condition. The employed solution, which contains 50 gr./l. $NH_3$, is in equilibrium condition at about 84° C.

Under these conditions, 60 gr. $NH_3$ are spontaneously evaporated for every liter of solution in the vessel 12. To distil also the remainder of $NH_3$ from the solution, the overall heat requirement, referred to 1 lt. solution, will be:

|  | Kcal. |
| --- | --- |
| To evaporate 50 gr. $NH_3$ | 25 |
| To heat the solution from 84° to 110° C | 25 |
| Total | 50 |

According to the process of the invention, the solution contained in vessel 12 is conveyed to the heat exchanger 4 wherein 30–40 gr. $NH_3$ are distilled and the temperature of the solution rises to 100–106° C. depending on the efficiency of the exchanger 4. The heat supplied for this operation is:

|  | Kcal. |
| --- | --- |
| To evaporate 30–40 gr. $NH_3$ | 15–20 |
| To heat the solution from 84° to 100°–106° C | 15–20 |
| Total | 30–40 |

Consequently 10–20 kcal. have to be supplied by means of steam to the next apparatus 8. No exact values have been recorded, but only limits within which one may operate, depending on the greater or lesser efficiency of the exchanger 4. The 30 to 40 kcal. recovered in the exchanger 4 are supplied by the heat of absorption of the $NH_3$. When indeed 110 gr. $NH_3$ are absorbed in the solution, 55 kcal. become available; 30–40 and more are removed through the exchanger 4 and the remainder serve to make up for the thermal losses of the apparatus equipment.

In conclusion, if one operates according to conventional methods, involving cooling of the absorption column 3 by means of a water jacket, the conventional distillation of the $NH_3$ from the solution in the apparatus 8 requires 50 kcal., which have to be supplied by means of steam at least at 2 atm. pressure. Steam at atmospheric pressure may be recovered from said water jacket. This steam is of less value, for practical use, than that consumed in tower 8; it cannot be practically employed in the same cycle. In contrast, if one operates according to the present invention, the heat recovered in the exchanger 4 is directly utilized in the cycle and will decrease the steam consumption in tower 8. A significant advantage is thus achieved.

Another advantage is that a better adjustment of absorption temperature in tower 3 is achieved. In fact, if water at 100° C. were made to evaporate in the exchanger 4, the absorption temperature would range between 105 and 130° C., depending on the exchanger efficiency, and in any case at a temperature determined by the design of apparatus A.

Again in contrast, in the process of this invention, the cooling means can circulate at a temperature variable at will between 70° and 80° C. when solution still containing $NH_3$, from separator 12, is utilized as above described, or up to 115–120° when on the contrary the solution substantially free from $NH_3$ is utilized, by partially recycling through the separator 13.

This process permits adjustment of the absorption temperature at any desired point, within the limits of from 90° to 140° C.; it permits therefore a flexibility of operation unattainable with the conventional method, and in an extremely simple manner. In fact, with reference to the accompanying drawing, assuming that it is desired to carry out absorption in tower 3 at the lowest temperature, valves 15, 14 will be kept closed and all solution conveyed from apparatus 12 to exchanger 4 at 84° C. if one assumes the data exemplified above and partially distilled and collected in apparatus 13, wherefrom it passes to apparatus 8.

If instead absorption at a higher temperature is desired, then by opening the valve 15 only a portion of the solution contained in apparatus 12, at for example 84° C. is conveyed to exchanger 4, simultaneously returning to exchanger 4 the remainder of solution by withdrawing it from apparatus 13 at 100°–115° as the case may be. This latter operation is performed by opening, suitably, the valve 14.

*Example*

Assuming that 110 gr. of ammonia are absorbed for every liter of 60% absorbing solution of $NH_4NO_3$ in water by a heat evolution of about 500 kcal./kg. of absorbed ammonia, and assuming further that the temperature of the solution collected at the bottom of tower 3 is included in the range between 115° and 125° C., the solution will attain, after release through valve 11, a temperature ranging between 80° and 90° C. owing to the evaporation of 45–55% of the absorbed ammonia. If the operation were according to prior processes, the remaining 45–55% of absorbed gas should be removed by heating with steam. In contrast when operating according to the invention, the released solution, at a temperature of 80–90° C., is conveyed to the heat exchanger 4, wherein by means of the heat evolved during absorption, evaporation is caused of another gas portion which may be evaluated to be about 25–45% of the total absorbed amount. Consequently, in the next lower, 8, only 10–20% of the gas has to be evaporated with steam consumption. Hence it may be said that when operating according to the known methods, 50–60 gr. of ammonia for every liter of absorbing solution have to be removed with steam consumption, whereas when operating as above described only 10–20 gr. $NH_3$ have to be removed with steam consumption. Simultaneously, absorption heat is removed and the temperature in the tower 3 is kept at a point between 90° and 140° C., for example at about 120° C., which is the optimum as to selectivity and convenience.

What we claim is:

1. A process of separating carbon dioxide from ammonia comprising passing, under pressure in an absorption zone, a carbon dioxide ammonia mixture in contact with an aqueous solution of a substance taken from the group consisting of ammonium nitrate and urea nitrate, the ammonia being absorbed by the solution to form an ammonia containing effluent solution, releasing at least part of the pressure upon substantially all of the said effluent solution to vaporize at least part of the ammonia therefrom and to cool the effluent solution, separating the vaporized ammonia from the cooled effluent solution in a separation zone under said released pressure and recycling at least part of the separated cooled effluent to absorb, by heat exchange, heat of absorption developed in the absorption zone and to vaporize more ammonia from the said recycled effluent, and thereafter passing the recycled effluent to a second separation zone to remove ammonia gas from the effluent and then recycling part of this effluent to absorb heat of absorption in the absorption zone by heat exchange as aforesaid, stripping another part of this effluent free of remaining ammonia and returning the stripped effluent to contact the carbon dioxide ammonia mixture to absorb ammonia therefrom.

2. The process of claim 1 in which the absorption temperature is maintained at between 90 to 140° C.

3. A process of separating carbon dioxide from ammonia comprising passing a carbon dioxide ammonia mixture in contact, under pressure in an absorption zone, with a selective absorbent solution, one of the components of mixture being absorbed by the solution to form a component containing effluent solution, releasing at least part of the pressure upon substantially all of the said effluent solution to vaporize at least part of the component therefrom and to cool the effluent solution, separating the vaporized component from the cooled effluent solution in a separation zone under said released pressure and recycling part of the latter separated cooled effluent to absorb, by heat exchange, heat of absorption developed in the absorption zone and to vaporize more of said component from the said recycled effluent, and passing the effluent from said heat exchange to a second separation zone to separate the vaporized component from the effluent and then recycling part of this separated effluent from the second separation zone to absorb heat of absorption in the absorption zone as aforesaid, stripping another part of the effluent free of remaining component and returning the stripped effluent to contact the carbon dioxide ammonia mixture to absorb said component therefrom.

4. The process of claim 3 in which the absorption temperature is maintained at between 90 to 140° C.

References Cited in the file of this patent

UNITED STATES PATENTS

| 2,634,826 | Cramer | Apr. 14, 1953 |

FOREIGN PATENTS

| 854,198 | Germany | Oct. 30, 1952 |
| 866,780 | France | June 9, 1941 |